United States Patent
Fujiwara et al.

(10) Patent No.: US 6,675,670 B2
(45) Date of Patent: Jan. 13, 2004

(54) AUTOMATIC TRANSMISSION OPERATING LEVER

(75) Inventors: Ryoichi Fujiwara, Kosai (JP); Yoshimasa Kataumi, Kosai (JP)

(73) Assignee: Fujikiko Kabushiki Kaisha (JP)

( * ) Notice: Subject to any disclaimer, the term of this patent is extended or adjusted under 35 U.S.C. 154(b) by 0 days.

(21) Appl. No.: 10/084,772

(22) Filed: Feb. 25, 2002

(65) Prior Publication Data
US 2002/0117018 A1 Aug. 29, 2002

(30) Foreign Application Priority Data
Feb. 27, 2001 (JP) ..................... P2001-052601

(51) Int. Cl.$^7$ ................................ G05G 1/06
(52) U.S. Cl. .................... 74/473.3; 74/523; 74/543
(58) Field of Search ................... 74/473.3, 473.36, 74/523, 524, 527, 543, 544, 548; 403/326, 329, 359.1

(56) References Cited

U.S. PATENT DOCUMENTS

| | | | | |
|---|---|---|---|---|
| 3,996,433 A | * | 12/1976 | Suzuki et al. | 200/61.27 |
| 4,197,611 A | * | 4/1980 | Bell et al. | 74/558.5 |
| 4,783,884 A | * | 11/1988 | Stricker et al. | 16/422 |
| 4,791,826 A | * | 12/1988 | Behrens | 74/543 |
| 5,284,400 A | * | 2/1994 | Thomas | 74/543 |
| 5,501,120 A | * | 3/1996 | Kikuchi et al. | 74/543 |
| 5,540,180 A | * | 7/1996 | Kataumi et al. | 74/473.3 |
| 5,588,329 A | * | 12/1996 | Nedachi | 74/543 |
| 5,884,530 A | * | 3/1999 | Sato et al. | 74/473.23 |
| 6,058,797 A | * | 5/2000 | Konig et al. | 74/523 |
| 6,421,881 B1 | * | 7/2002 | Shovlin | 74/548 |

FOREIGN PATENT DOCUMENTS

JP 6179331 6/1994

* cited by examiner

*Primary Examiner*—David A. Bucci
*Assistant Examiner*—Bradley J. Van Pelt
(74) *Attorney, Agent, or Firm*—Kilpatrick Stockton LLP

(57) ABSTRACT

An automatic transmission operating lever 1 including a bar 2 jointed with a base 3 on a base-side end thereof, a knob 5 into which the bar 2 is inserted, a first engagement mechanism and a second engagement mechanism. The first engagement mechanism includes a first engaging portion 21 axially extending on an outer surface on the other end of the bar 2 and a second engaging portion 51*b* to be engaged with the first engaging portion 21, which is provided in the knob 5. The second engagement mechanism includes a protrusion 3*d* on the outer surface on the base-side end of the bar 2 and a hook 51*f* to be latched on the protrusion 3*d*, which is provided in the knob 5. The first engagement mechanism starts engagement before the second engagement mechanism.

8 Claims, 5 Drawing Sheets

AUTOMATIC TRANSMISSION OPERATING LEVER

BACKGROUND OF THE INVENTION

1. Field of the Invention

The present invention relates to an automatic transmission operating lever.

2. Description of the Related Art

Heretofore, various types of automatic transmission operating levers have been manufactured. There is a publicly known automatic transmission operating lever including a stick-shaped bar and a knob with a hole to engage therewith and cover an outer surface of the bar. The bar and the knob are coupled by use of screws or by press-inserting the bar into the hole.

The use of screws increases the number of the parts. The press-insertion requires a high precision for engagement thereof, thus causing difficulty in reducing assembly time and manufacturing cost.

SUMMARY OF THE INVENTION

The object of the present invention is to provide an automatic transmission operating lever with a reduced number of the parts and assembly time, thus contributing to lower cost.

A first aspect of the present invention is an automatic transmission operating lever comprising: a bar having a base coupled on a base-side end thereof; a knob into which the bar is inserted; a first engagement mechanism comprising a first engaging portion extending axially on an outer surface on the other end of the bar and a second engaging portion to be engaged with the first engaging portion, the second engaging portion being provided in the knob; and a second engagement mechanism comprising a protrusion on the outer surface on the base-side end of the bar and a hook to be latched on the protrusion, the hook being provided in the knob, wherein the first engagement mechanism starts engagement before the second engagement mechanism.

A second aspect of the present invention is the automatic transmission operating lever according to the first aspect, wherein the first engagement mechanism restrains the rotational movement of the knob relative to the bar and the second engagement mechanism restrains the axial movement thereof.

A third aspect of the present invention is the automatic transmission operating lever according to the first aspect, wherein the first engaging portion and the second engaging portion are engaged by press-insertion.

A fourth aspect of the present invention is the automatic transmission operating lever according to the first aspect, wherein the second engaging portion comprises a plurality of protruding portions each having a leading portion with a width narrowing in a circumferential direction toward the base.

A fifth aspect of the present invention is the automatic transmission operating lever according to the first aspect, wherein the protrusion is made of a same resin as the base and formed monolithically with the base.

A sixth aspect of the present invention is the automatic transmission operating lever according to the first aspect, further comprising: a guide key axially extending on the outer surface on the base-side end of the bar; and a guide slot provided on a base-side end of the knob, wherein the guide key starts engagement with the guide slot before the first engagement mechanism starts engagement.

A seventh aspect of the present invention is the automatic transmission operating lever according to the sixth aspect, wherein the guide slot comprises a guiding portion widening toward the base.

An eighth aspect of the present invention is the automatic transmission operating lever according to the sixth aspect, wherein the guide key is made of the same resin as the base and formed monolithically with the base.

A ninth aspect of the present invention is the automatic transmission operating lever according to the first aspect, further comprising: an elastic layer covering the knob, wherein the elastic layer extends from the base-side end of the knob to the base.

In the first and second aspects constituted as described above, the bar and the knob are coupled at both ends of the bar; at the upper end of the bar with the first engaging portion and the second engaging portion of the first engagement mechanism; and at the base-side end of the bar with the protrusion and the hook of the second engagement mechanism. The first engagement mechanism prevents the movement of the knob relative to the bar in both directions around and across the axis of the bar. The second engagement mechanism prevents the movement of the knob relative to the bar in an axial direction. A simple single push action is required to latch the hook onto the protrusion and complete the engagement of the second engagement mechanism. This eliminates the necessity for screws and the like for fixing the knob to the bar, and reduces the number of parts and assembly time, thus contributing to lower costs.

In the third aspect, the first engaging portion and the second engaging portion are made so as to allow engagement by press-insertion; therefore, movement of the knob relative to the bar in direction around and across the axis of the bar can be eliminated.

In the fourth aspect, each of the protruding portions in the second engaging portion has a leading portion with a width in a circumferential direction narrowing toward the base; therefore, each of the protruding portions can be lead into a respective receiving portion when the knob is inserted on the bar. This contributes to easy assembly.

In the fifth aspect, the protrusion is made of the same resin as the base and formed monolithically with the base; therefore, the protrusion and the base are formed at one time, thus reducing the production cost.

In the sixth aspect, a guide key is provided on the outer surface on the base-side end of the bar and extends in an axial direction, and on a base-side end of the knob, a guide slot is provided. The guide key starts engagement with the guide slot before the first engagement mechanism engages; therefore, the direction of the knob relative to the bar can be fixed before the first engaging portion and the second engaging portion start engagement during assembly. This eliminates errors in the direction of the knob in the assembly process.

In the seventh aspect, since the guide slot includes a guiding portion with a width in a circumferential direction widening toward the base, the guide key can be lead into the guiding slot when the knob is inserted on the bar. This contributes to easy assembly.

In the eighth aspect, since the guide key is made of the same resin as the base and formed monolithically with the base, the guide key and the base can be formed at one time, thus reducing the production cost.

In the ninth aspect, an elastic layer extends from the base-side end of the knob to the base. When the hook is latched on the protrusion, the elastic layer is deformed or compressed between the base and the base-side end of the knob, and generates a resilient force. Hence, the movement of the knob in an axial direction can be prevented.

BRIEF DESCRIPTION OF THE DRAWINGS

The invention will now be described with reference to the accompanying drawings, wherein.

DETAILED DESCRIPTION OF THE PREFERRED EMBODIMENT

Figure 1:
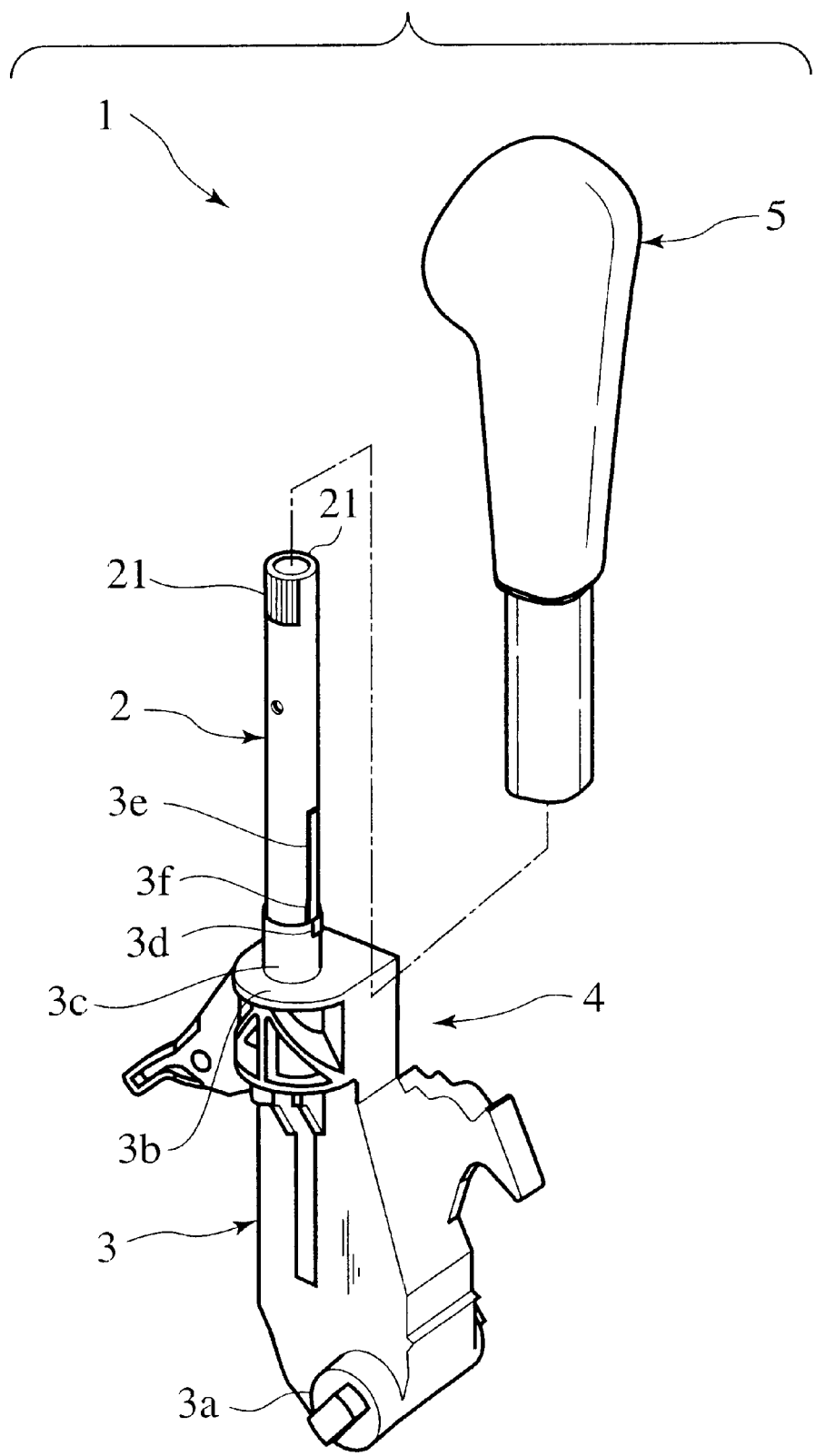
FIG. 1 is an exploded perspective view showing an automatic transmission operating lever as one embodiment of the present invention.

An embodiment of the present invention will be explained below with reference to the drawings, wherein like members are designated by like reference characters.

As shown in FIGS. 1 to 6, an automatic transmission operating lever 1 shown in this embodiment includes a lever body 4 having a base 3 joined monolithically to a bottom (base-side end) of a bar 2; and a knob 5 having a hole 51a for the accommodation of the bar 2, which is to be inserted from its top end (the other end) of the bar so that the outer surface of the bar 2 is completely covered.

Figure 7:
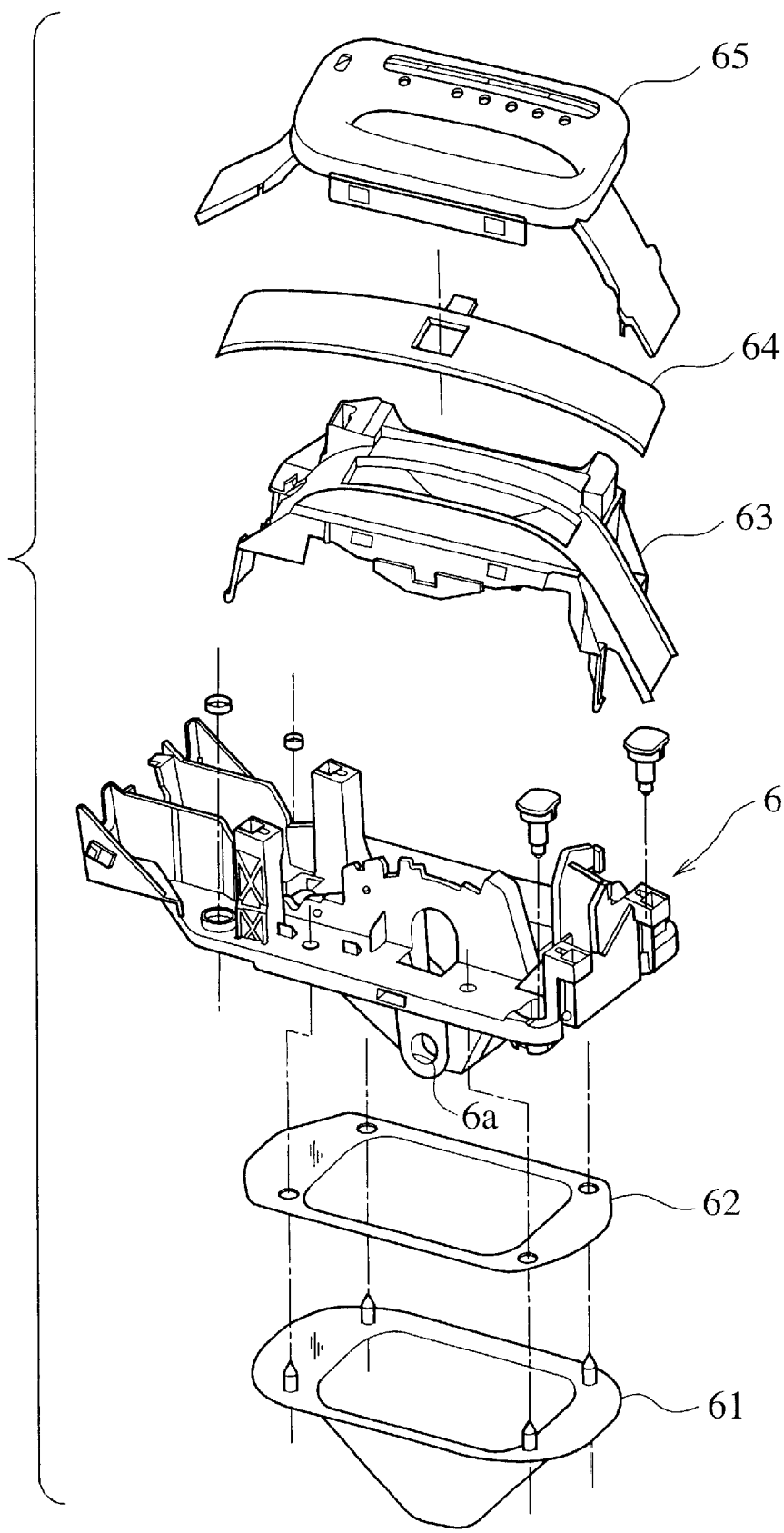
FIG. 7 is an exploded perspective view of an apparatus supporting the automatic transmission operating lever.

Note that, as shown in FIG. 7, the lower end of the automatic transmission operating lever 1 is rotatably supported by a support stage 6 provided in a vehicle cabin. Specifically, a support shaft 3a (FIG. 1) provided on a lower end of the base 3 is rotatably supported in a support hole 6a (FIG. 7) provided in a lower end of the support stage 6, and the knob 5 (FIG. 1) swings in the front-back direction of the vehicle about a fulcrum, i.e. the support hole 6a. Moreover, in FIG. 7, the support stage 6 is mounted to a cover 61 covering a lower side thereof with a packing 62 inbetween. A guide frame 63 for guiding the automatic transmission operating lever 1 in the front-back direction is mounted to the support stage 6, with a slide plate 64 and a display cover 65 for displaying transmission positions and the like installed on top of the guide frame 63.

As shown in FIG. 1, the bar 2 made of metal such as iron is formed into a cylindrical shape, and on an outer circumference at the top thereof, a serration 21 is provided as an axially extending first engaging portion. In this embodiment, the serrations 21 are provided in two spots symmetrical with respect to the axis of the bar 2 and are formed to have chevron convexes (protruding portions) and concaves (receiving portions). For engagement with the knob 5, each convex of the serrations 21 is formed so as not to protrude out from the outer circumferential surface of the bar 2. Note that, the serrations 21 maybe provided on the entire circumference of the bar 2, and may alternatively be formed in one spot with a specified width.

A top surface 3b of the base 3 is perpendicular to the axis of the bar 2, and a guide portion 3c fixed to the bottom of the bar 2 and covering the outer surface thereof is monolithically formed with the top surface 3b. And a protrusion 3d, with which a hook 51f to be described later is engaged, (the protrusion 3d and the hook 51f compose the second engagement mechanism) are monolithically formed to the outer surface of the guide portion 3c. The protrusion 3d protrudes from the outer surface of the guide portion 3c in a rectangular shape by a specified amount. Moreover, a guide key 3e fixed to the outer surface of the bar 2 and extending axially upward from the upper end of the guide portion 3c is formed monolithically with the guide portion 3c. The height of the guide key 3e from the outer surface of the bar 2 is approximately equal to that of the guide portion 3c and the width of the guide key 3e is constant along the entire length thereof.

At the lower end of the guide key 3e, a taper 3f widening linearly toward the guide portion 3c is provided. The guide keys 3e and the tapers 3f are provided at two spots symmetrical with respect to the axis of the bar 2. One guide key 3e is disposed on the same axial line as the protrusion 3d. As described above, the support shaft 3a, the top surface 3b, the guide portion 3c, the protrusion 3d and the guide key 3e are formed monolithically with the base 3, specifically, by injection molding using a hard resin in a state where the bar 2 is inserted thereto. Note that, the guide key 3e may be provided on one spot instead of two spots as in this embodiment.

Figure 2:
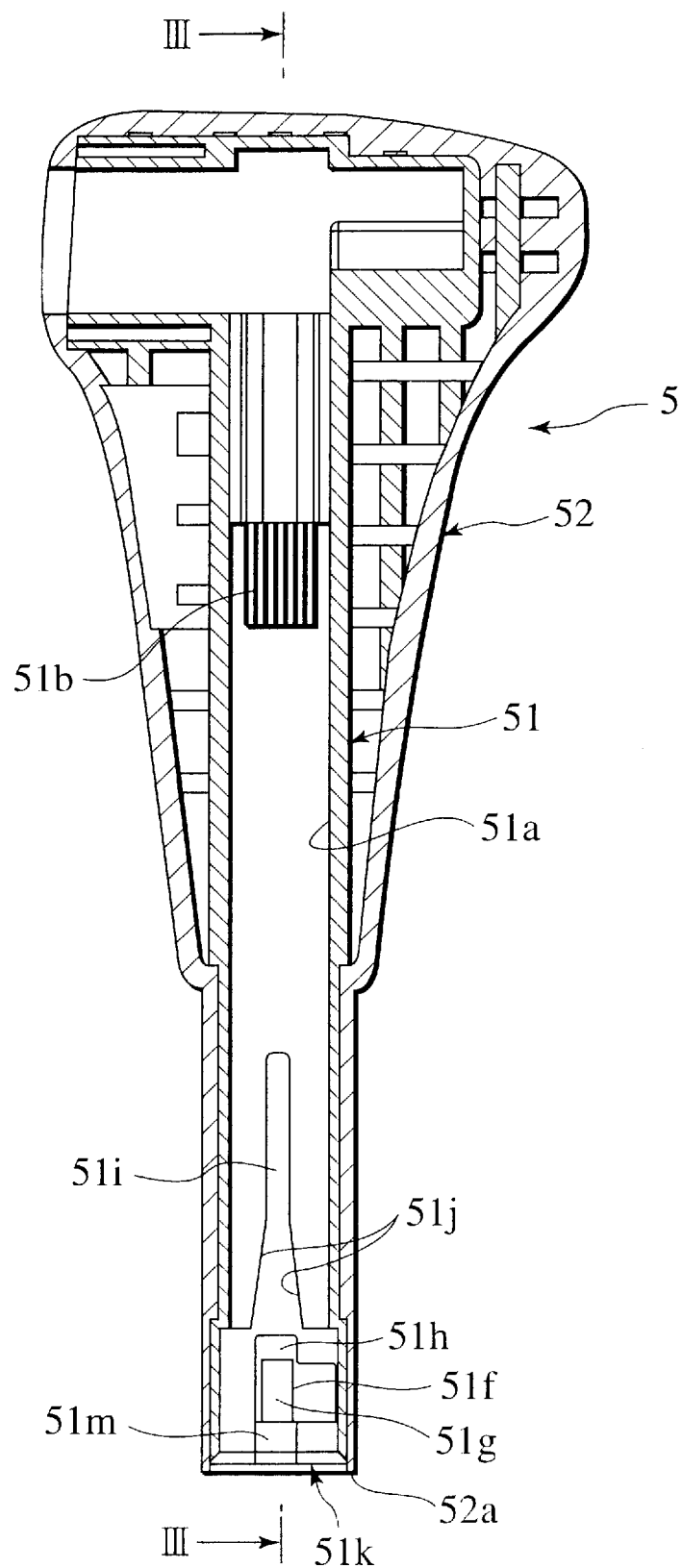
FIG. 2 is a sectional view of a knob of the automatic transmission operating lever.
Figure 3:
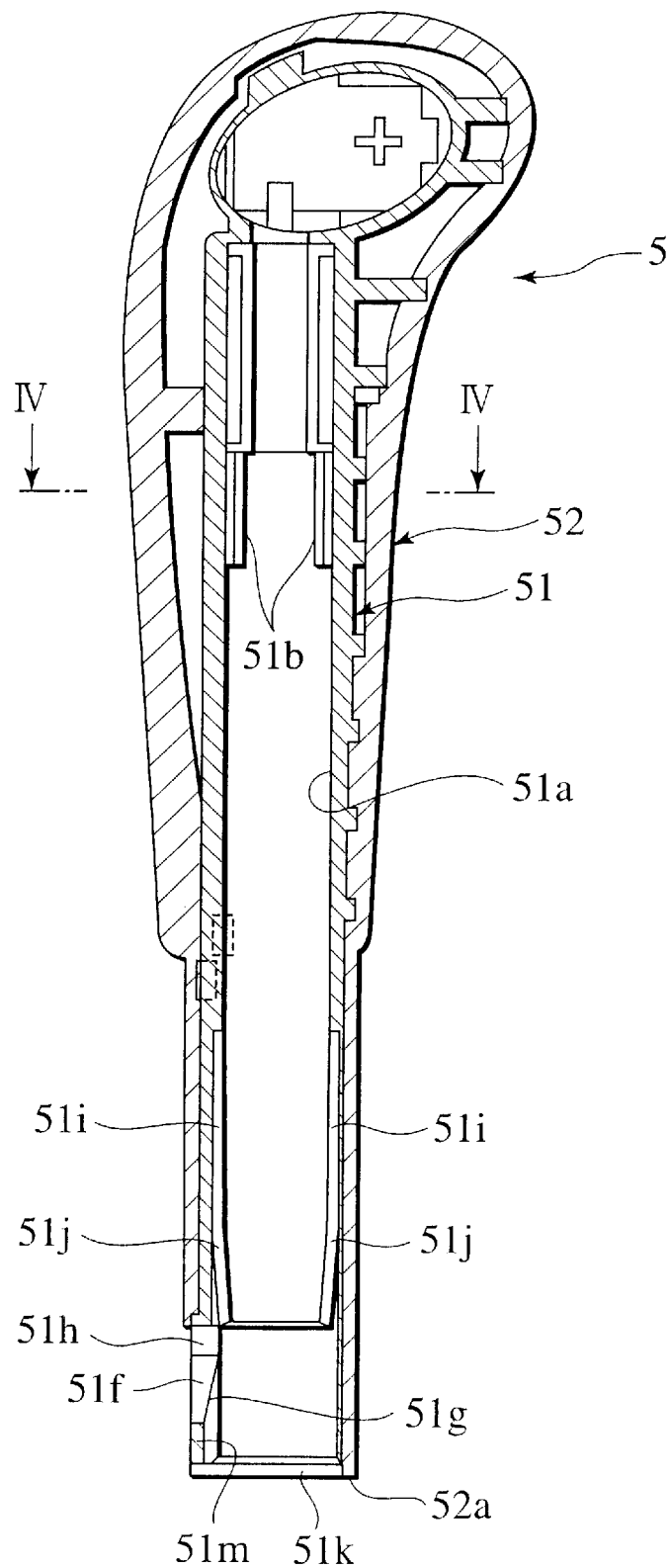
FIG. 3 is a sectional view of the knob of the automatic transmission operating lever taken along a line III—III of FIG. 2.

As shown in FIGS. 2 and 3, the knob 5 is composed of a knob body 51 monolithically formed of a hard resin and a elastic layer 52 covering the outer surface of the knob body 51.

The hole 51a having an opening at the bottom of the knob body 51 extends axially upward.

Figure 4:
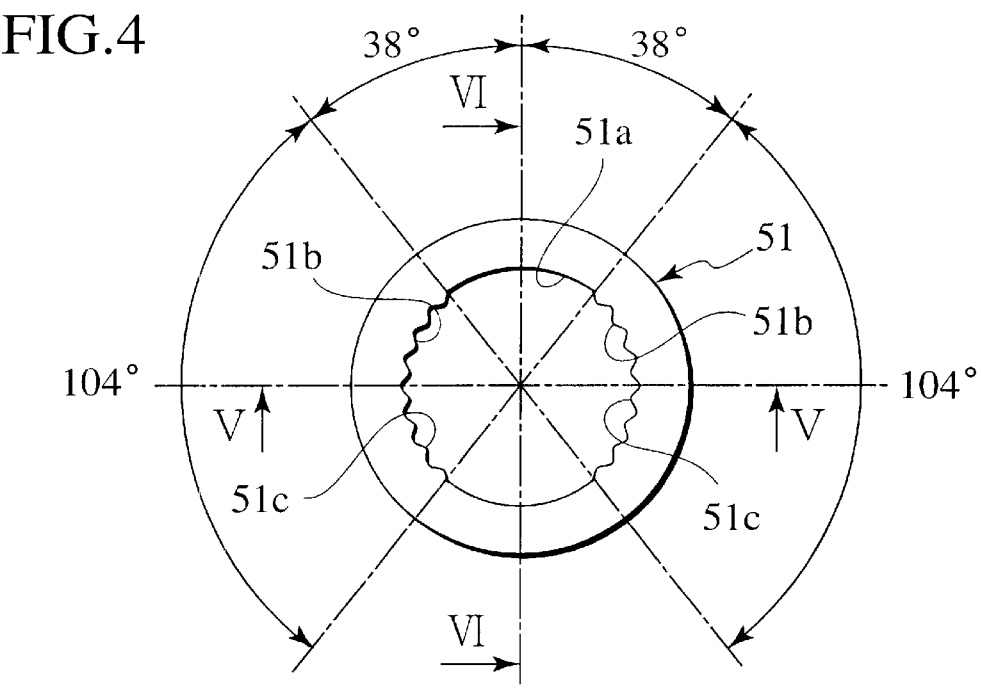
FIG. 4 is a plan view of the knob of the automatic transmission operating lever taken along a line IV—IV of FIG. 3.

In the hole 51a, a second engaging portion 51b to be engaged with the serration 21 (the serration 21 and the second engaging portion 51b compose the first engagement mechanism) is located at a position corresponding to the serration 21 of the bar 2 in a state where the knob 5 is coupled to the bar 2 (a state where the hook 51f to be described later is latched onto the protrusion 3d). Note that, as shown in FIG. 4, the second engaging portion 51b are provided in spots symmetrical with respect to the axis of the hole 51a as the center of the circular section. The serration 21 and the second engaging portion 51b are made in so as to allow the engagement by press-insertion.

Figure 5:
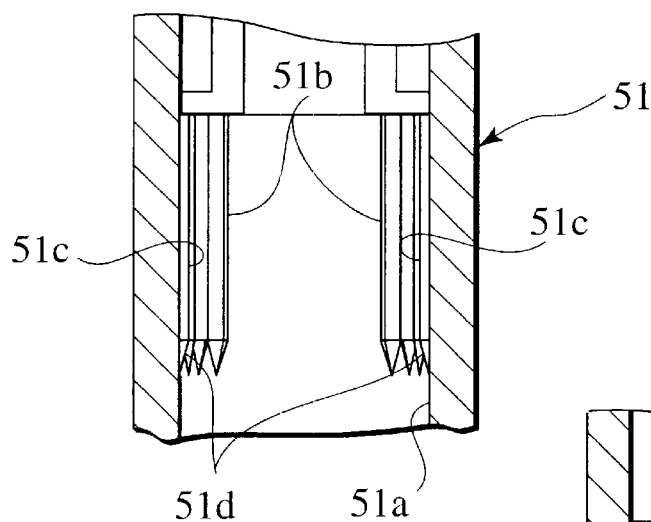
FIG. 5 is a sectional view of the knob of the automatic transmission operating lever taken along a line V—V of FIG. 4.
Figure 6:
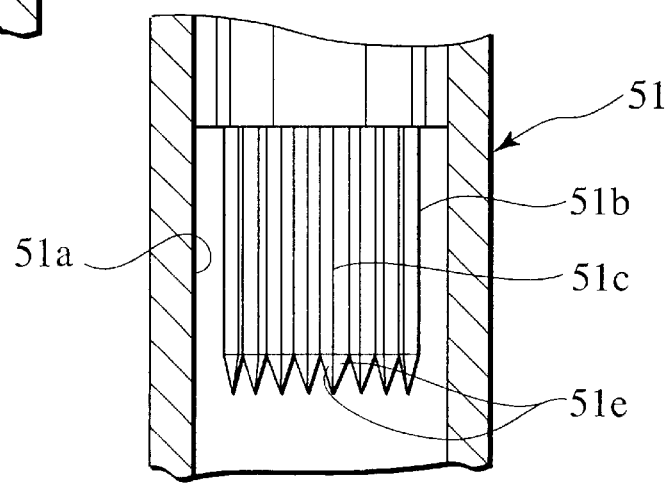
FIG. 6 is a sectional view of the knob of the automatic transmission operating lever taken along a line VI—VI of FIG. 4.

Moreover, as shown in FIGS. 4 to 6, each convex 51c (protruding portion) of the second engaging portion 51b extends in an axial direction of the hole 51a, protruding inward from the inner circumferential surface thereof. The convex 51c has a peak ridge line extending in a straight line parallel to the axis of the hole 51a; and a slanting ridge 51d at its lower end, that if extended as an imaginary straight line (not shown) would cross both the axis of the hole 51a and the peak ridge line of convex 51c. Relative to the increasing distance down along an imaginary line extending from the peak ridge line toward the base 3, the peak line of the slanting ridge 51d approaches and meets the inner circumferential surface of the hole 51a. The slanting ridge 51d is formed by the juncture of two triangular flat faces as leading faces 51e, thus forming the leading portion of the convex 51c with a width narrowing in a circumferential direction toward the base 3.

Furthermore, as shown in FIGS. 2 and 3, on the lower end of the knob body 51, the hook 51f is provided, to be latched on the protrusion 3d after the serration 21 and the second engaging portion 51b start engagement. When the bar 2 is inserted to the knob body 51, the protrusion 3d contacts and crosses a slant surface 51g, and pushes the hook 51f outward. When the protrusion 3d has passed over the slant surface 51g, the hook 51f springs back, and the protrusion 3d is positioned in an engaging hole 51h, thus preventing the axial movement of the knob body 51 relative to the bar 2. Moreover, a guide groove 51m is defined along the path of the protrusion 3d, on the inner circumferential surface of the hole 51a.

Furthermore, a guide slot 51i is provided at the lower end of the knob body 51, which is to be engaged with the guide key 3e prior to the engagement of the serration 21 and the second engaging portion 51b. This guide slot 51i is a groove on the inner circumferential surface of the hole 51a, having a same contour as the guide key 3e. At a lower end of the guide slot 51i, a guiding portion 51j is provided, which is linearly widening toward the base 3 for smoothly receiving the guide key 3e. The guiding portion 51j is designed to receive the taper 3f of the guide key 3e.

Meanwhile, the elastic layer 52 made of an elastic resin of vinyl chloride or the like is in order to enhance the touch quality of the knob 5. A lower end of the elastic layer 52 extends out from an open end 51k in the hole 51a toward the base 3, and this extending-out portion 52a presses against the top surface 3b of the base 3 and is elastically deformed by a specified amount in a state where the hook 51f is latched onto the protrusion 3d.

In the automatic transmission operating lever 1 constituted as described above, the top of the bar 2 is coupled to the knob 5 by the serration 21 and the second engaging portion 51b, and the bottom of the bar 2 is coupled to the knob 5 by the protrusion 3d and the hook 51f. Consequently, the bar 2 is coupled to the knob 5 at both ends thereof.

The engagement between the serration 21 and the second engaging portion 51b prevents the movement of the knob 5 relative to the bar 2 in both directions around and across the axis of the bar 2. The engagement of the protrusion 3d with the hook 51f prevents the movement of the knob 5 relative to the bar 2 in an axial direction. A single push action is simply required to latch the hook 51f onto the protrusion 3d and complete the engagement. This eliminates the necessity for screws and the like for fixing the knob to the bar, and reduces the number of the parts and assembly time, thus contributing to lower cost.

Moreover, the serrations 21 and the second engaging portions 51b are made so as to allow the engagement by press-insertion; therefore, the movement of the knob 5 relative to the bar 2 in the direction around and across the axis of the bar 2 can be eliminated. Note that, the respective convexes and concaves of the serration 21 and the second engaging portion 51b deform and shift in a rotational direction; therefore, bringing the advantage that precise machining is not necessary to ensure that the convexes and concaves to obtain a even fastening force, and that a required thrust for the press-insertion is less than that in the case with circular surfaces. Moreover, the required thrust for press-insertion can be controlled by the changing lengths of the serrations 21 and the second engaging portions 51b in an axial direction or a range in a circumferential direction at which the serrations 21 and the second engaging portions 51b are formed (in this embodiment, the range is two spots, each in a range of 104°.).

In addition, the respective convex 51c of the second engaging portions 51b has leading faces 51e forming the leading portion thereof with a width narrowing in a circumferential direction toward the base 3; therefore, the respective convexes of the serrations 21 can be lead into the respective receiving portions between the respective convexes 51c when the bar 2 is inserted into the knob 5. This contributes to easy assembly.

Moreover, the support shaft 3a, the top surface 3b, the guide portion 3c, the protrusion 3d and the guide key 3e are made of the same resin as the base 3 and formed monolithically therewith; therefore, all of the above are formed at one time, thus reducing production costs.

Furthermore, on the outer surface of the base-side end of the bar 2, a guide key 3e is provided and extends in an axial direction, and on a base-side end of the knob 5, a guide slot 51i is provided. The guide key 3e starts engagement with the guide slot 51i before the serration 21 and the second engaging portion 51b engages; therefore, the direction of the knob 5 relative to the bar 2 can be fixed before the serration 21 and the second engaging portion 51b start engagement during assembly. This eliminates errors in the direction of the knob in the assembly process.

In addition, since the guide slot 51i has the guiding portion 51j, the guide key 3e can be readily inserted to the guide slot 51i. Hence, improvement in the assembling capability can be achieved.

Furthermore, the elastic layer 52 extends out from the open end 51k of the hole 51a toward the base 3. When the hook is latched on the protrusion, the extending portion 52a of the elastic layer 52 is deformed or compressed between the base 3 and the base-side end of the knob 5, and generates a resilient force. Hence, the movement of the knob 5 in an axial direction can be prevented.

Although only one embodiment of the invention has been disclosed and described, it is apparent that the other embodiments and modification of the invention are possible.

What is claimed is:

1. An automatic transmission operating lever comprising:
    a bar having a base coupled on a base-side end thereof;
    a knob into which the bar is inserted;
    a guide mechanism comprising a guide key axially extending on the outer surface on the base-side end of the bar and a guide slot to be engaged with the guide key, the guide slot being provided inside the knob;
    a first engagement mechanism comprising a first engaging portion axially extending on an outer surface on the distal end of the bar and a second engaging portion to be engaged with the first engaging portion, the second engaging portion being provided inside the knob; and
    a second engagement mechanism comprising a protrusion on the outer surface on the base-side end of the bar and a hook to be latched on the protrusion, the hook being provided inside the knob,
    wherein the guide mechanism, the first engagement mechanism and the second engagement mechanism are configured such that as the bar is inserted into the knob, the guide mechanism starts engagement, then the first engagement mechanism starts engagement, and then the second engagement mechanism starts engagement.

2. The automatic transmission operating lever according to claim 1, wherein the first engagement mechanism restrains a rotational movement of the knob relative to the bar and the second engagement mechanism restrains an axial movement thereof.

3. The automatic transmission operating lever according to claim 1, wherein the first engaging portion and the second engaging portion are engaged by press-insertion.

4. The automatic transmission operating lever according to claim 1, wherein the second engaging portion comprises a plurality of protruding portions each having a leading portion with a circumferential width which narrows as it extends in a direction toward the base.

5. The automatic transmission operating lever according to claim 1, wherein the protrusion is made of a same resin as the base and formed monolithically with the base.

6. The automatic transmission operating lever according to claim 1, wherein the guide slot comprises a guiding portion widening toward the base.

7. The automatic transmission operating lever according to claim 1, wherein the guide key is made of the same resin as the base and formed monolithically with the base.

8. The automatic transmission operating lever according to claim 1, wherein the knob is covered with an elastic layer, which has an extended portion from the base-side end of the knob to the base, and wherein the extended portion of the layer is compressed between the base-side end of the knob and the base, as the second engagement mechanism engages.

* * * * *